United States Patent [19]

Hunyar et al.

[11] 3,941,547

[45] Mar. 2, 1976

[54] PHONOGRAPH RECORD PRESSING DIE ASSEMBLY

[75] Inventors: Csaba K. Hunyar, Sunland; Jesse Green, Torrance, both of Calif.

[73] Assignee: United Artists Music and Records Group, Inc., Los Angeles, Calif.

[22] Filed: May 12, 1975

[21] Appl. No.: 576,292

Related U.S. Application Data

[63] Continuation of Ser. No. 469,387, May 13, 1974, abandoned.

[52] U.S. Cl. ............... 425/407; 425/408; 425/810
[51] Int. Cl.² ................ B30B 15/06; B29D 17/00
[58] Field of Search ....... 425/407, 408, 810; 249/79

[56] References Cited
UNITED STATES PATENTS

| | | | |
|---|---|---|---|
| 1,307,812 | 6/1919 | Errickson | 425/810 X |
| 1,576,642 | 3/1926 | Bishop | 425/408 |
| 1,582,704 | 4/1926 | Sylvester et al. | 425/810 X |
| 2,092,880 | 9/1937 | Hunter et al. | 425/810 X |
| 3,752,620 | 8/1973 | Renoux | 425/408 X |
| 3,830,459 | 8/1974 | Strausfeld | 425/810 X |
| R15,608 | 5/1923 | Burroughs | 425/810 X |

*Primary Examiner*—J. Howard Flint, Jr.
*Attorney, Agent, or Firm*—William W. Haefliger

[57] ABSTRACT

An assembly attachable to upper and lower bases of a phonograph record pressing die includes:

a. upper and lower die frames, the upper die frame attachable to the upper base, and the lower die frame attachable to the lower die base, and b. upper and lower die faces, the upper die face attached to the upper frame, and the lower die face attached to the lower frame, the upper die face directly overlying the lower die face to press a phonograph record therebetween, c. there being a first set of fluid passing grooves formed in at least one of the upper frame and upper face and exposed to the other thereof, and another set of heat transfer fluid grooves formed in at least one of the lower frame and lower face and exposed to the other thereof.

11 Claims, 7 Drawing Figures

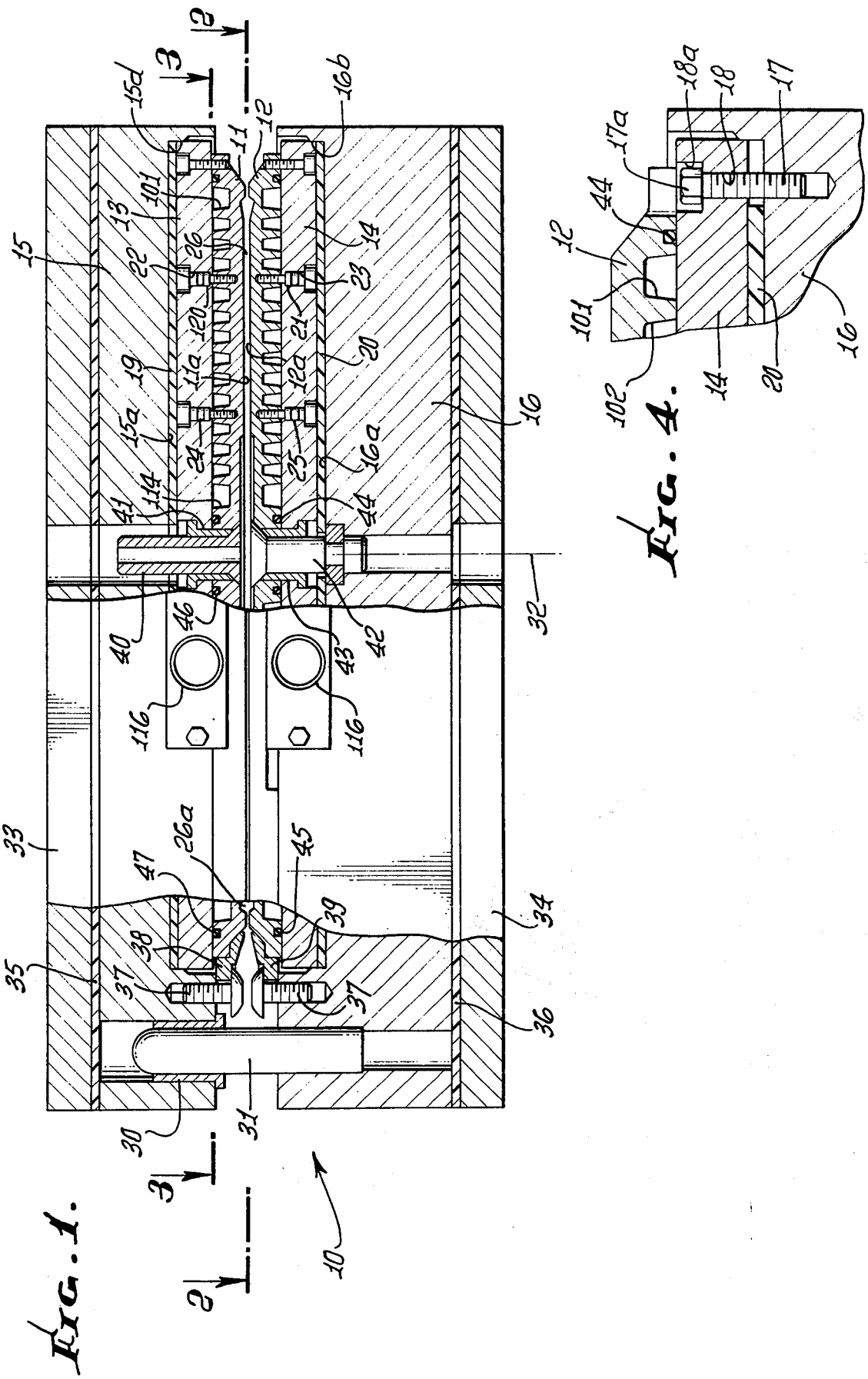

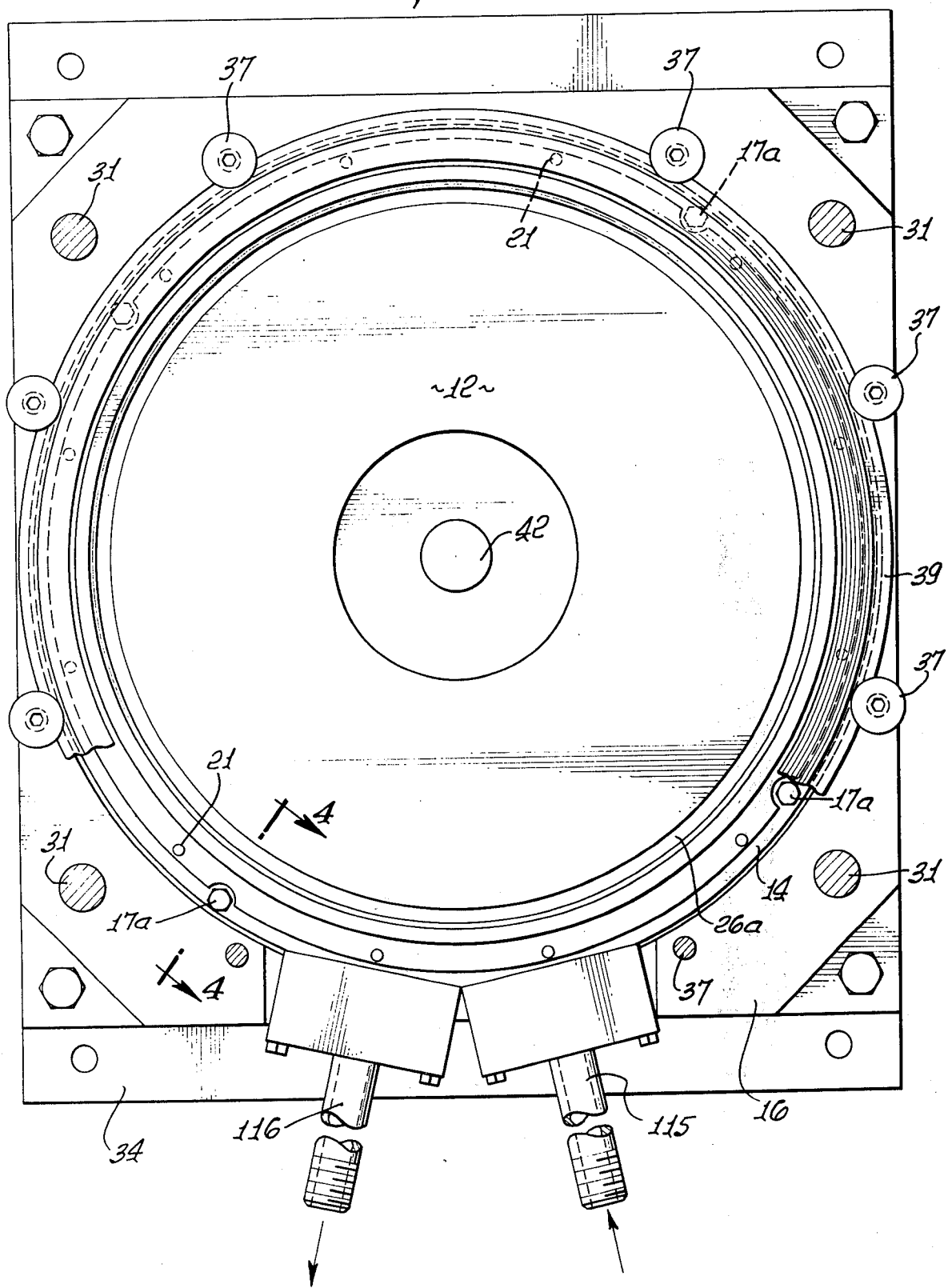

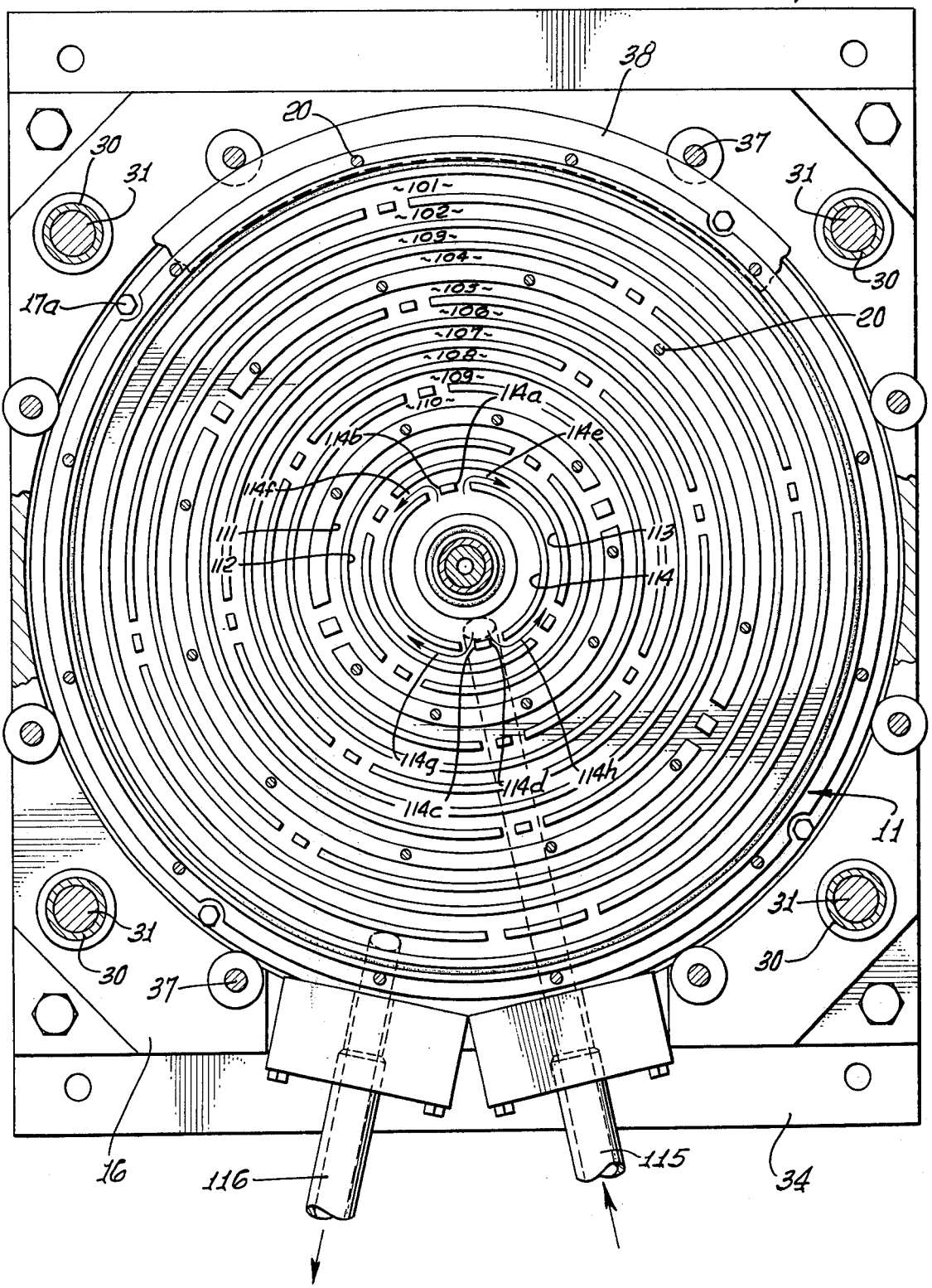

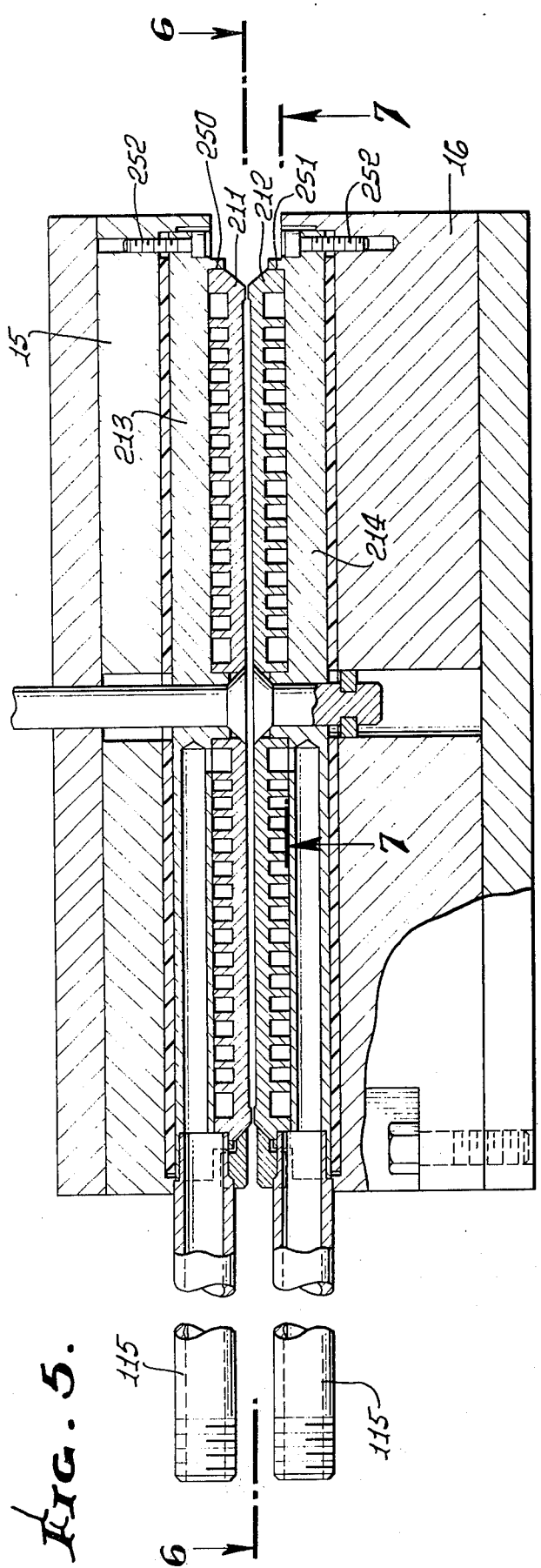
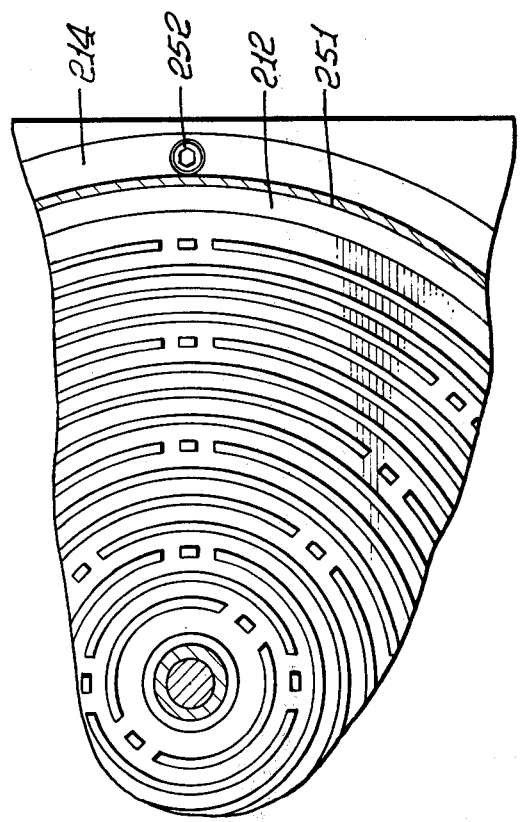

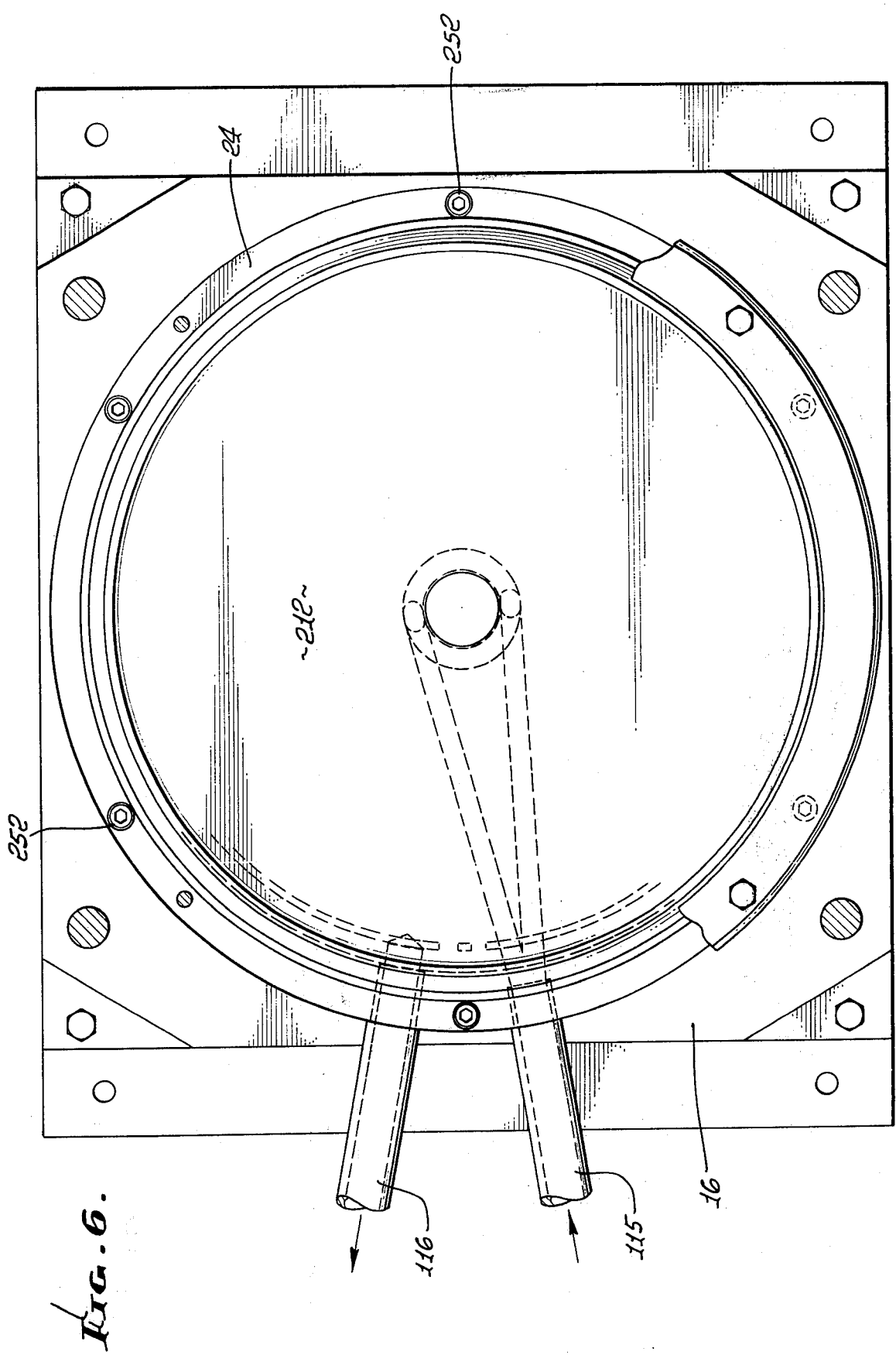

PHONOGRAPH RECORD PRESSING DIE ASSEMBLY

This is a continuation of application Ser. No. 469,387, filed May 13, 1974, now abandoned.

BACKGROUND OF THE INVENTION

This invention relates generally to phonograph record production, and more particularly concerns substantial improvements in the construction, maintenance and replacement of pressing dies.

Recent commercial pressing dies are characterized by rectangular construction wherein the face-frame and base are of one-piece design. The four corners of the die act as a heat sink, slowing the performance or usage time of the die, and also creating a non-uniform heat distribution pattern. This in turn causes unwanted stresses producing warpage in phonograph records. In addition, the spiral or other groove pattern for passing heating and cooling fluid in conventional dies makes cleaning and flushing of the grooves undesirably difficult and time consuming, slowing down the die performance.

SUMMARY OF THE INVENTION

It is a major object of the invention to provide a record pressing die construction overcoming the above as well as other difficulties and problems encountered in die fabrication, maintenance and usage. Basically, the invention is embodied in a combination that includes:

a. upper and lower die frames, the upper die frame attachable to the upper base, and the lower die frame attachable to the lower die base, and b. upper and lower die faces, the uppper die face attached to the upper frame, and the lower die face attached to the lower frame, the upper die face directly overlying the lower die face to press a phonograph record therebetween.

c. there being a first set of fluid passing grooves formed in at least one of the upper frame and upper face and exposed to the other thereof, and another set of cooling fluid grooves formed in at least one of the lower frame and lower face and exposed to the other thereof.

As will appear, each of the frames and faces desirably has circular disc shape; insulating plates are employed between the frames and heavier mounting bases therefor; the frames and faces are connected as by removable fasteners or by brazing; each frame and face pair is removably mounted by a heavier base.

Further, the grooves of each frame and face set may be circular and concentrically formed in the face element; and radial passages are provided to interconnect the concentric grooves providing multiple (as for example four) paths for fluid passage between inlet and outlet ducts.

These and other objects and advantages of the invention, as well as the details of illustrative embodiments, will be more fully understood from the following description and drawings, in which:

DRAWING DESCRIPTION

FIG. 1 is an elevation, partly in section, showing one form of the invention;

FIG. 2 is a plan view on lines 2—2 of FIG. 1;

FIG. 3 is a plan view on lines 3—3 of FIG. 1;

FIG. 4 is an enlarged fragmentary elevation, on lines 4—4 of FIG. 2;

FIG. 5 is an elevation, in section showing another form of the invention;

FIG. 6 is a plan view on lines 6—6 of FIG. 5; and

FIG. 7 is a fragmentary plan view on lines 7—7 of FIG. 5.

DETAILED DESCRIPTION

In FIG. 1, the record pressing die assembly 10 includes like upper and lower metallic faces 11 and 12 between which a record is pressed, like upper and lower metallic frames 13 and 14, and upper and lower metallic bases 15 and 16. Each of the frames and faces has circular disc shape, the thickness of each frame and face being substantially less than its associated base. As is clear from FIG. 4, circularly spaced fasteners 17 attach the frame 14 to base 16, there being through bores 18 in the frame to pass the fasteners, with fasteners heads 17a received in counterbores 18a. Similar fasteners attach the upper frame 13 to the upper base 15. Accordingly, each frame and face assembly may be removed from its base, for cleaning, and insulating plates or discs 19 and 20 may be retained between the respective frames and bases to prevent heat transfer between the frames and bases, enabling speed-up of the heating and cooling cycles, and saving energy. Plates 19 and 20 may consist of glass-epoxy material, or other suitable insulative material, and they are received against the bottom walls 15a and 16a of recesses 15b and 16b formed by the bases.

Multiple fasteners such as cap head bolts 120 attach the upper frame 13 to upper face 11, while similar fasteners 21 attach lower frame 14 to lower face 12. Note that through bores 22 and 23 in the frames pass the bolts so that the bolts holes need not extend to the record pressing surfaces 11a and 12a of the faces 11 and 12. The bolts are equidistantly circularly spaced in three concentric rings, as is clear from FIG. 4. O-ring seals 24 and 25 seal off between the bolts and bores. A disc shaped gap 26 is formed between surfaces 11a and 12a, the gap having substantially uniform thickness equal to the thickness of a record to be pressed; however, the gap includes a thickened peripheral annular portion 26a, as seen in FIG. 1.

The above described construction facilitates separation of each frame and face pair after its removal from the associated base, as by removal of the fasteners, thereby exposing heating and cooling fluid passing grooves for removal of scale build-up or other contaminant or clogging material. Such grooves are formed in at least one of the frame and face elements, and preferably in the frame side of the face element for open exposure when the face and frame are separated.

Reference to FIGS. 1 and 3 shows the provision of concentric grooves 101–114 in face 12, similar grooves being provided in face 11. Fluid is communicated to or from innermost groove 114 via duct 115, and fluid is communicated from or to outermost groove 101 via duct 116. Also, there are radial passages interconnecting the concentric grooves, and preferably there are at least four radial escape passages from each circular groove so that fluid flows in four streams between the innermost and outermost grooves. Thus, for example, see the four radial passages 114a–114d interconnecting the two grooves 114 and 113, and the four exiting fluid streams 114e–114h. Also, passages 114a and 114b are relatively close, and diametrically opposite close together passages 114c and 114d. Similar analysis applies to each of the grooves. Accordingly, flushing time of the assembled die is extremely short, speeding up the pressing cycle; also the even distribution over the area of the face disc of the passage pairs associated with successive grooves (i.e., by symmetrical angular offsetting thereof) assures even distribution of die heating and cooling zones, reducing stress and warpage in the pressed record. (Note that the passage pairs are distributed at 45° angles over the face disc). Further, since the channels or grooves are circular and not spiral shaped, machining is simpler. In addition, because of the quadruple channel design, the channel flow cross section is very large. This allows narrowing of the channels and reducing the wall thickness between channels without reducing the strength of the die. More channels with less steel between them provide a much greater heat transfer surface between heating and cooling media and the die material, speeding up the pressing cycle. As a matter of fact, due to the narrowness of the channels, the face thickness can be reduced without reducing the strength of the die. This again increases the heat transfer from the heating and cooling media to the plastic, making the die "faster." Finally, the face elements may be replaced with minimum expense, as the frames and bases are re-usable.

FIG. 1 also shows the provision of guide bushings 30 in base 15 receiving telescopically interfitting guide pins 31 projecting from base 16, to guide the opening and closing together movements of the faces 11 and 12, along axis 32. Bolster plates 33 and 34 are attached to the bases via thin plates 35 and 36. Screws 37 retain stamper mounting rings 38 and 39 in position overlapping the face edges. Center mounting structure such as is indicated at 40 and 41 axially aligns the upper frame and face, and center mounting structure as indicated at 42 and 43 axially aligns the lower face and frame. Tube 40 may receive injection of the record material fed to gap or zone 26 to be pressed into record shape. O-rings 44–47 seal off between the frames and faces at the inner and outer peripheries of the grooves or channels 101–114.

Turning now to FIGS. 5–7, the construction is very similar to that described above, with the exception that the two faces 211 and 212 are braze connected to their respective frames 213 and 214, as at peripheral locations 250 and 251, or other locations. Each frame and face pair may be removed and replaced in its associated base, when desired, and in the manner as discussed above, i.e., by removal of fasteners 252 corresponding to fasteners 17.

We claim:

1. For use in a phonograph record pressing die having upper and lower bases, the combination comprising
   a. upper and lower die frames, the upper die frame attachable to the upper base, and the lower die frame attachable to the lower die base, and
   b. upper and lower die faces, the upper die face attached to the upper frame, and the lower die face attached to the lower frame, the upper die face directly overlying the lower die face to press a phonograph record therebetween,
   c. there being a first set of fluid passing grooves formed in at least one of the upper frame and upper face and exposed to the other thereof, and another set of heat transfer fluid grooves formed in at least one of the lower frame and lower face and exposed to the other thereof,
   d. the grooves of each set being circular, coaxial and concentric, adjacent concentric grooves of each set being connected only by generally radial passages at multiple locations mutually relatively spaced about the groove axis, there being at least two pairs of said radial escape passages from each circular groove into the next radially outward circular groove, said two pairs being angularly offset about said axis, the pairs of escape passages from each said groove also being angularly offset from the pairs of escape passages from said next radially outward circular groove.

2. The combination of claim 1 wherein each of said frames and faces has circular disc shape.

3. The combination of claim 2 wherein said grooves are sunk in said faces at the sides thereof facing said frames.

4. The combination of claim 3 including insulating plates at the sides of each of said frames opposite said faces.

5. The combination of claim 4 including said upper and lower bases attached to said upper and lower frames, respectively, one insulating plate extending between the upper base and upper frame, and another insulating plate extending between the lower base and lower frame.

6. The combination of claim 16 including interfitting guide means on said bases to guide relative movement thereof displacing said faces relatively toward and away from each other.

7. The combination of claim 1 wherein a disc shaped gap is formed between said faces, said gap having substantially uniform thickness except for a thickened peripheral annular portion.

8. The combination of claim 1 including fasteners attaching said upper frame to the upper face, and also said lower frame to the lower face, there being through bores in the frames to pass the fasteners.

9. The combination of claim 1 wherein said frames are braze connected to the respective faces.

10. The combination of claim 1 wherein said generally radial passages are substantially uniformly distributed over the face area.

11. The combination of claim 1 including a first fluid duct directly communicating with only the innermost of said grooves, and a second fluid duct directly communicating with only the outermost of said grooves, one duct being a fluid inlet duct and the other duct being a fluid outlet duct.

* * * * *